(12) United States Patent
Tetkoskie et al.

(10) Patent No.: US 10,131,967 B1
(45) Date of Patent: Nov. 20, 2018

(54) SCRAP SUBMERGENCE WALLED WELL (71) Applicants: Jason Tetkoskie, Aurora, OH (US);
Richard S. Henderson, Solon, OH
(US)

(72) Inventors: Jason Tetkoskie, Aurora, OH (US);
Richard S. Henderson, Solon, OH
(US)

(73) Assignee: PYROTEK, INC., Aurora, OH (US)

( * ) Notice: Subject to any disclaimer, the term of this
patent is extended or adjusted under 35
U.S.C. 154(b) by 202 days.

(21) Appl. No.: 14/757,900

(22) Filed: Dec. 24, 2015

Related U.S. Application Data (60) Provisional application No. 62/096,593, filed on Dec. 24, 2014.

(51) Int. Cl.
*B22D 41/08* (2006.01)
*C22B 21/00* (2006.01)
*C22B 7/00* (2006.01)

(52) U.S. Cl.
CPC .......... *C22B 21/0092* (2013.01); *C22B 7/003* (2013.01)

(58) Field of Classification Search
CPC ..................................... F27B 3/16; F27B 3/18
USPC ......................................................... 266/233
See application file for complete search history.

(56) References Cited

U.S. PATENT DOCUMENTS

| | | | |
|---|---|---|---|
| 3,424,186 A * | 1/1969 | Sparks | ................ C22B 21/0084 |
| | | | 137/205 |
| 3,873,305 A | 3/1975 | Claxton et al. | |
| 3,955,970 A | 5/1976 | Claxton et al. | |
| 3,984,234 A | 10/1976 | Claxton et al. | |
| 3,997,336 A | 12/1976 | van Linden et al. | |
| 4,128,415 A | 12/1978 | van Linden et al. | |
| 4,286,985 A | 9/1981 | van Linden et al. | |
| 4,930,986 A | 6/1990 | Cooper | |
| 5,984,999 A * | 11/1999 | Areaux | ............... C22B 21/0092 |
| | | | 266/233 |
| 6,036,745 A * | 3/2000 | Gilbert | .................... C22B 7/003 |
| | | | 266/233 |
| 6,217,823 B1 | 4/2001 | Vild et al. | |
| 7,662,335 B2 | 2/2010 | Vild et al. | |
| 2011/0133374 A1* | 6/2011 | Cooper | ................... C22B 7/003 |
| | | | 266/200 |

\* cited by examiner

*Primary Examiner* — Scott R Kastler
(74) *Attorney, Agent, or Firm* — Fay Sharpe LLP (57) ABSTRACT

A scrap submergence device having an open top chamber including walls constructed of a heat resistant material is provided. The chamber includes an inlet in the side wall of the chamber for receiving molten metal, an outlet in the side wall of said chamber, and an interior wall extending from the base wall. The interior wall has a height lower than a height of the at least one side wall. The inlet is disposed on a first side of the interior wall and the outlet is disposed on a second side of the interior wall.

14 Claims, 6 Drawing Sheets

SCRAP SUBMERGENCE WALLED WELL

BACKGROUND

The present invention is directed to a scrap submergence system of the type typically employed in metal recycling processes, particularly, the recycling of aluminum.

In the recycling of metals, it is necessary to melt scrap pieces for treatment and processing. A large portion of aluminum scrap pieces are thin walled as a result of the mechanical shaping action from which they are formed, such as, shaving, boring and cold rolling. Melting thin walled scrap pieces is particularly difficult because (i) extended exposure to the hostile atmosphere in a traditional melting furnace results in extremely high oxidation loss and, (ii) rapid submerging in molten metal is severely hampered by the fact that thin walled scrap pieces float on molten metal ("floating scrap").

In a typical melting operation used to convert floating scrap to ingot, a melting furnace is provided with an enclosed hearth and a connected open sidewell. Usually the sidewell is divided into a pump well and a melting bay. A pump or other molten metal flow inducing apparatus is positioned externally to the melting bay (e.g., in the pump well), and causes molten metal to flow from the hearth to the melting bay. Typically the melting bay is further divided into a chargewell and a drosswell. Metal scrap pieces are fed into the melting bay, particularly the chargewell portion thereof.

A variety of apparatus have been used in the melting bay (specifically in the chargewell) to facilitate the submergence of the scrap metal below the surface of the molten metal bath. Three major types of systems exist. A common objective of each system is to increase molten metal circulation and improve contact between all surfaces of the metal scrap pieces and the molten metal. The first type includes mechanical systems constructed primarily of a rotor which creates a molten metal flow from the top surface. Examples of these devices are shown in U.S. Pat. Nos. 3,873,305; 3,997,336; 4,128,415; and 4,930,986. The second type of system uses a mechanical device to physically push the scrap below the melt surface (e.g., elephant feet/well-walkers). The third type of system relies on the shape of the chamber without rotation of a rotor to create a metal flow which submerges scrap pieces in the chargewell. Particularly, the flow of molten metal into the chargewell is manipulated in such a manner to achieve a vortex which draws chips from the top surface into the bath. These systems include, for example, U.S. Pat. Nos. 3,955,970; 3,984,234; 4,286,985; 6,036,745; and 6,217,823, each of which is herein incorporated by reference.

The present invention is directed to a fourth type of scrap submergence system wherein a folding of flowing molten metal is used to submerge scrap metal pieces.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a scrap submergence device having an open top chamber including walls constructed of a heat resistant material is provided. The chamber includes an inlet in a side wall of the chamber for receiving molten metal, an outlet in a side wall of the chamber, and an interior wall extending from the base wall. The interior wall has a height lower than a height of the at least one side wall. The inlet is disposed on a first side of the interior wall and the outlet is disposed on a second side of the interior wall.

According to a second embodiment, a metal scrap submergence device comprising an open top chamber is provided. The chamber includes at least one side wall, a base wall and an interior wall of a heat resistant material. An inlet is provided in one portion of the side wall for receiving molten metal. A ramp is positioned adjacent the inlet. An outlet is also provided.

According to a further embodiment, the present disclosure is directed to a method of recycling metal, particularly aluminum, employing the devices described in the preceding paragraphs.

BRIEF DESCRIPTION OF THE DRAWINGS

The invention consists in the novel parts, construction, arrangements, combinations and improvements, shown and described. The accompanying drawings, which are incorporated in and constitute a part of the specification illustrate one embodiment of the invention and together with the description, serve to explain the principles of the invention.

DETAILED DESCRIPTION

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined by the appended claims.

The present invention is directed to a scrap submergence system of the type typically employed in metal recycling processes, such as, the recycling of aluminum. In the recycling of metals, it is necessary to melt scrap pieces for treatment and processing. A large portion of aluminum scrap pieces are thin walled as a result of the mechanical shaping action from which they are formed, such as, shaving, boring and cold rolling. Melting thin walled scrap pieces is particularly difficult because rapid submerging in molten metal is severely hampered by the fact that thin walled scrap pieces float on molten metal. Problematically, extended exposure to the hostile atmosphere in a traditional melting furnace results in extremely high oxidation loss In a typical melting operation used to convert lightweight scrap to ingot, a melting furnace is provided with an enclosed hearth and a connected open sidewell. Usually the sidewell is divided into a pump well and a melting bay. A pump or other molten metal flow inducing apparatus is positioned externally to the melting bay (e.g., in the pump well), and causes molten metal to flow from the hearth to the melting bay. Typically the melting bay is further divided into a charge well and a drosswell. Metal scrap pieces are fed into the melting bay, particularly the charge well component thereof. Floating dross is skimmed from the surface of the molten metal in the dross well.

Figure 1:
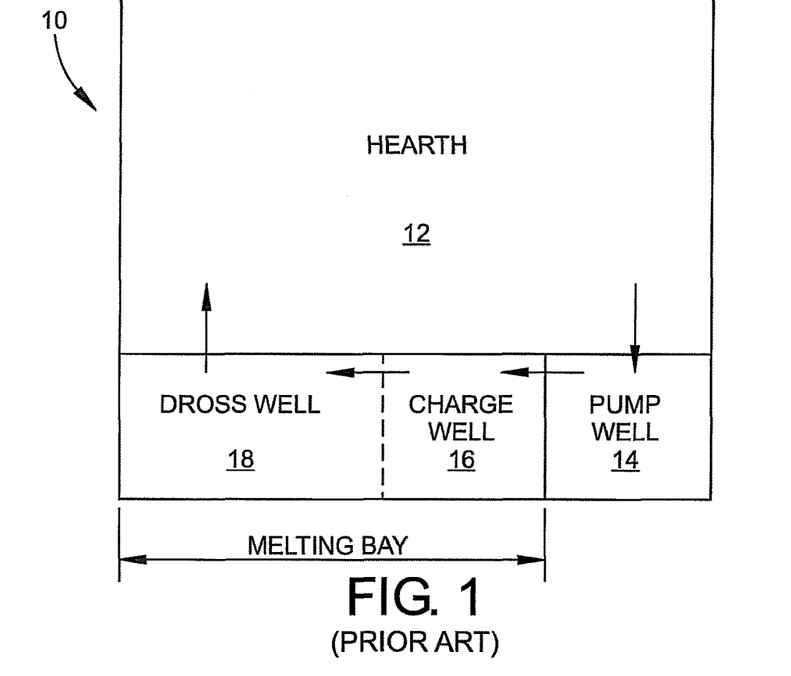
FIG. 1 is a schematic representation of a molten metal recycling furnace.

Referring now to FIG. 1, an aluminum recycling furnace 10 is depicted. Furnace 10 includes a main hearth component 12 which is heated, for example, with gas or oil burners or by any other means known in the art. Adjacent, and in fluid communication with the hearth 12 (typically via submerged archways), is the primary recycling area comprised of a pump well 14, a charge well 16, and a dross well 18. Although not shown, the wall of hearth 12 opens to the pump well 14, the pump well opens to the charge well 16, the charge well opens to the dross well 18, and the dross well opens to the hearth 12 to allow the circulation pattern shown by the arrows. The pump well can include a mechanical molten metal pump of any type known to those skilled in the art. Alternatively, the well and pump can be replaced by an electromagnetic pump, for example. The molten metal pump circulates molten metal from the hearth 12 to the charge well 16 where scrap chips of the metal to be recycled are deposited onto the surface of the melt. The charge well is also a location where additional metal or fluxes can be added to achieve a desired alloy. Molten metal from the charge well 16 flows into the dross well 18 wherein impurities in the form of dross are skimmed from the surface before the melt flows back into the hearth 12. This particular disclosure is directed to an improved design of the charge well 16.

Figure 2:
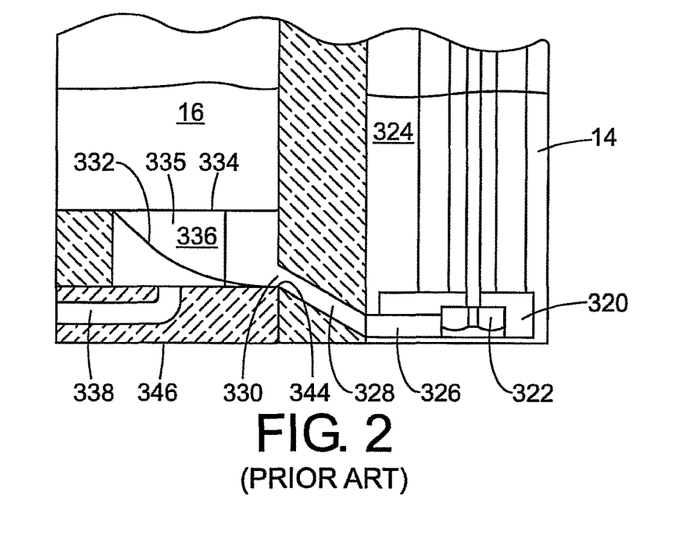
FIG. 2 is a cross-sectional view of a prior art pump well and charge well.

Referring now to FIG. 2, the pump well 14 and charge well 16 of an exemplary prior art system is displayed. Pump 320 is positioned in pump well 14 and draws molten aluminum from the hearth forcing it into the charge well 16. More particularly, the rotation of impeller 322 draws molten aluminum from the bath 324, into the pump 320 and forces it through outlet 326, up passage 328, and through inlet 330 into the charge well 16. Molten aluminum flows up the ramp 332 within charge well 16, spilling over an inner edge 334 of inner column 335 into cavity 336, and exits through outlet 338. The leading edge 344 of the ramp 332 can be positioned adjacent the inlet 330. Although the system of FIG. 2 has proven to be highly commercially successful, it has a minor drawback in that the charge well 16 includes a raised floor 346 which is required to provide bottom outlet 338. This feature can be inconvenient in facilities where drawing a furnace to a low molten metal level is often desired.

Although the above description has been directed to a prior art device, it is noted that several features therein are equally applicable to the present disclosure and will be therefore be equally pertinent to the following discussion. Accordingly, the above description is also incorporated into the description of the present embodiment.

Figure 3:
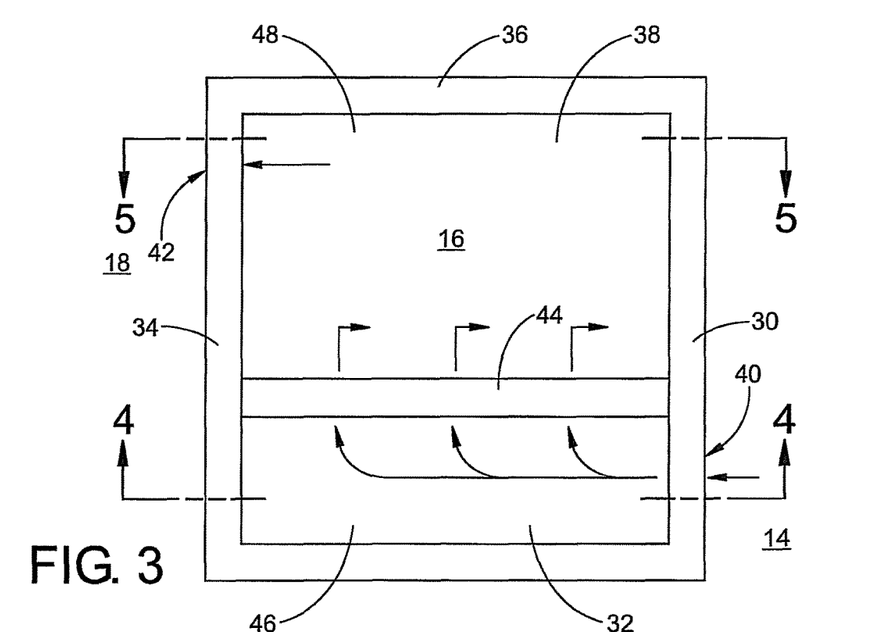
FIG. 3 is a top plan view of the charge well of the present disclosure.
Figure 4:
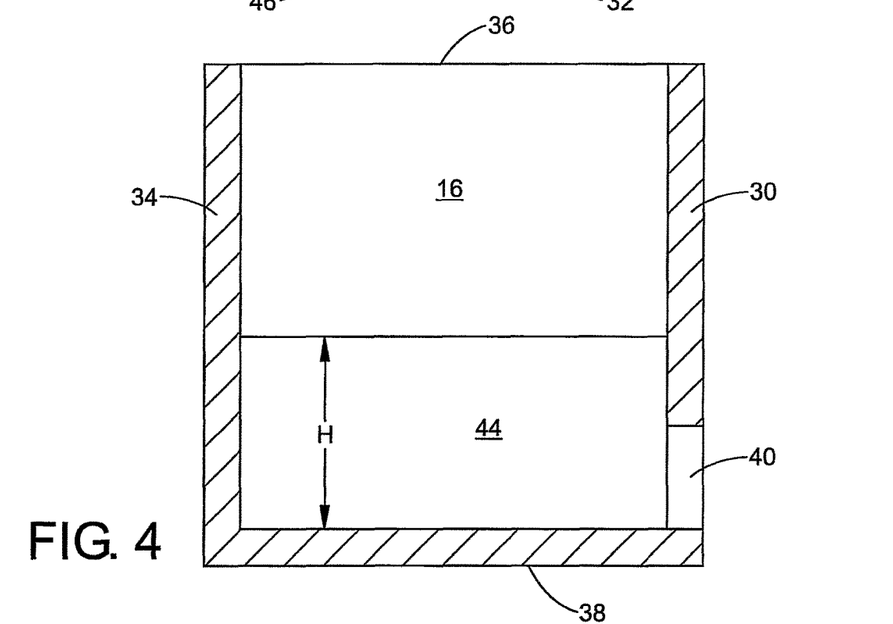
FIG. 4 is a cross-sectional view of the charge well of FIG. 3 taken along line 4-4.
Figure 5:
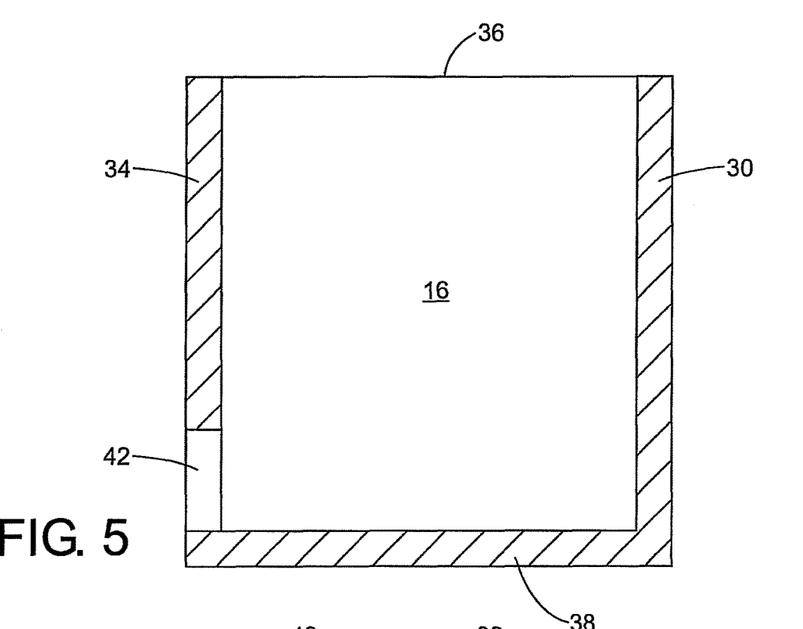
FIG. 5 is a cross-sectional view of the charge well of FIG. 3 taken along line 5-5.

Referring now to FIGS. 3, 4, and 5, the charge well 16 of the present disclosure is depicted. As illustrated, charge well 16 is positioned between pump well 14 and dross well 18. While these wells are depicted as aligned in a manner shown in FIG. 1, it is noted that the presently disclosed charge well is not required to reside in this orientation with respect to a pump well and a dross well. For example, it is feasible for the pump well and the dross well to be positioned adjacent or on the same sides of the charge well. Furthermore, it is feasible that the dross well is omitted and molten metal exiting the charge well can be directly returned to the furnace or other location required by the user. Similarly, while the depicted charge well is square (in cross-section), alternative shapes such as rectangular, triangular; circular, cylindrical, and ovoid as examples, are considered suitable when outfitted with the interior wall described hereinbelow.

Returning again to FIGS. 3, 4, and 5 charge well 16 is comprised of side walls 30, 32, 34 and 36 and a base wall 38. Side wall 30 is provided with an inlet 40 and side wall 34 is provided with an outlet 42. An interior wall 44 is provided which extends between opposed walls 30 and 34, effectively dividing the charge well 16 into a first compartment 46 and a second compartment 48. Interior wall 44 can have a height H less than the height of any of walls 30, 32, 34 or 36.

In operation, molten metal is directed by a pump located in pump well 14 through inlet 40 and into the first compartment 46. Interior wall 44 creates an impediment to flow of molten metal between inlet 40 and outlet 42, resulting in a rise of molten metal depth in compartment 46. When the molten metal depth in the furnace is below the height H of interior wall 44, as molten metal flows across wall 44 and into compartment 48 a waterfall of molten metal develops. In addition, submerging currents are formed in the second compartment 48. Furthermore, in a situation where the depth of the molten metal in the furnace is above the height H of interior wall 44, submerging currents continue to advantageously form in the second compartment 48. Charging of scrap materials into compartment 48 or an alternative location upstream of compartment 48 allows the relatively buoyant scrap materials to be subjected to the waterfall type of flow and subsequent folding associated with the molten metal. This folding includes submerging currents formed in the molten metal within compartment 48 which help to submerge metal scrap pieces. These flow patterns have been found effective in the submergence of the scrap particles wherein their induction into the bath of molten metal provides for a rapid melting thereof. Arrows are provided in FIG. 3 to depict the flow pattern within charge well 16.

Figure 6:
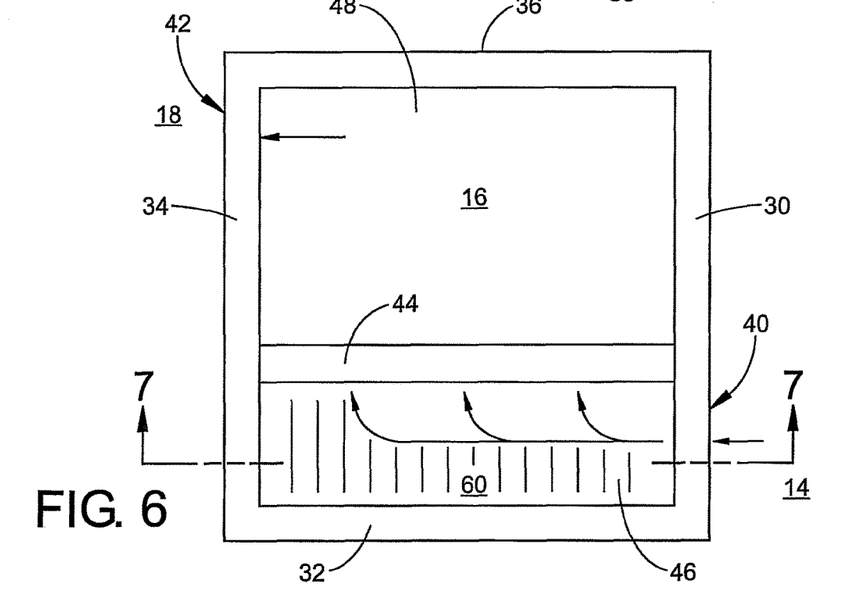
FIG. 6 is a top plan view of an alternative charge well of the present disclosure including a ramp element.
Figure 7:
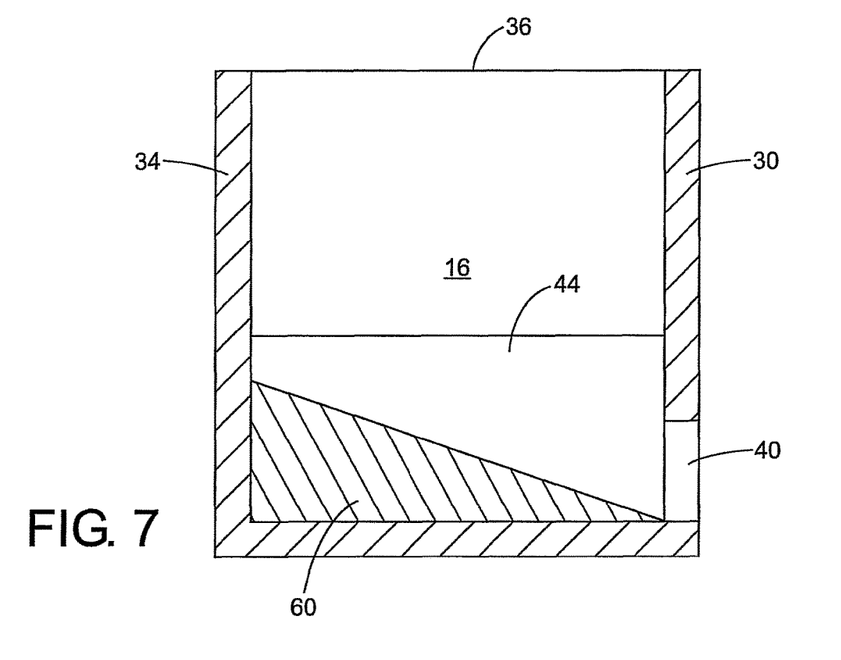
FIG. 7 is a cross-sectional view of the charge well of FIG. 6 taken along line 7-7.
Figure 8:
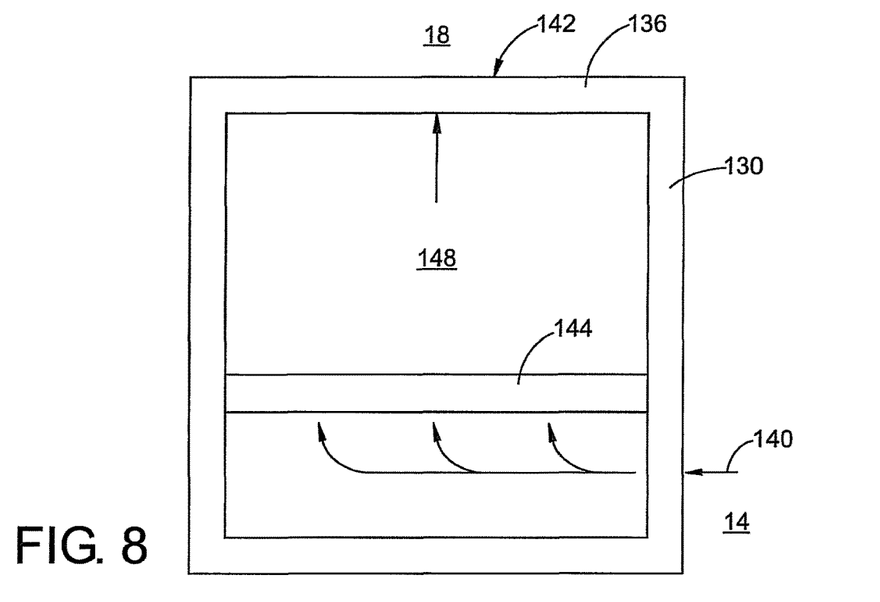
FIG. 8 is a top plan view of an alternative charge well of the present disclosure wherein the outlet has been repositioned.
Figure 9:
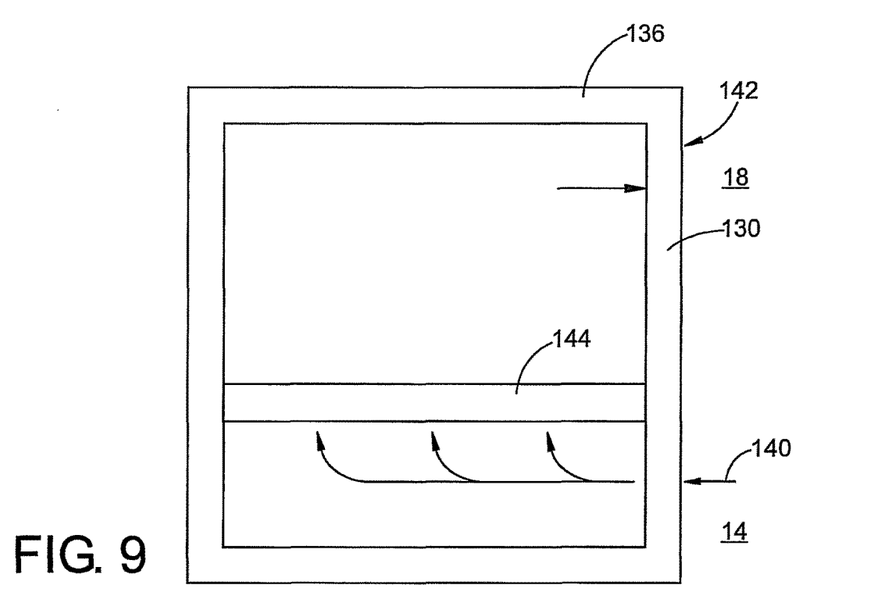
FIG. 9 is a top plan view of an alternative charge well of the present disclosure wherein the outlet has been further repositioned.

Turning next to FIGS. 6 and 7, an alternative embodiment is disclosed wherein the compartment 46 is further equipped with a ramp element 60 disposed between wall 32 and interior wall 44. Ramp 60 is inclined from a low point adjacent the inlet 40 to a high point adjacent the wall 34. It is contemplated that the inclusion of the ramp can increase the upward trajectory of flowing molten metal, enhancing the effect of the waterfall flow as the molten metal traverses interior wall 44. In this regard, it is contemplated that the ramp is of various slopes, continuous and/or discontinuous, and/or extends the full length or a partial length of compartment 46. Furthermore, it is contemplated that a charge well 16 including only a ramp can be effective in improving scrap submergence FIGS. 8 and 9 are provided to illustrate the fact that the outlet 142 from compartment 148 can be located in any of the three walls downstream of interior wall 144.

Figure 10:
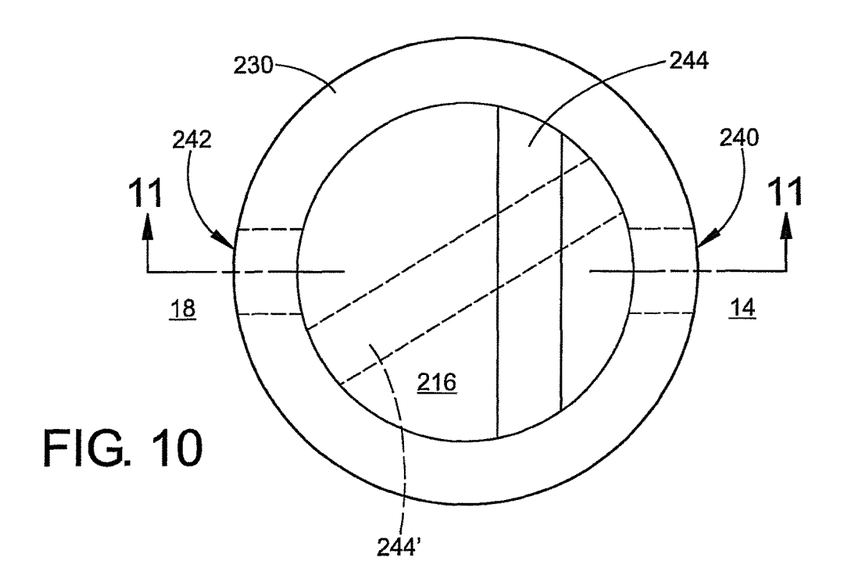
FIG. 10 is a top plan view of an alternative cylindrical charge well of the present disclosure.
Figure 11:
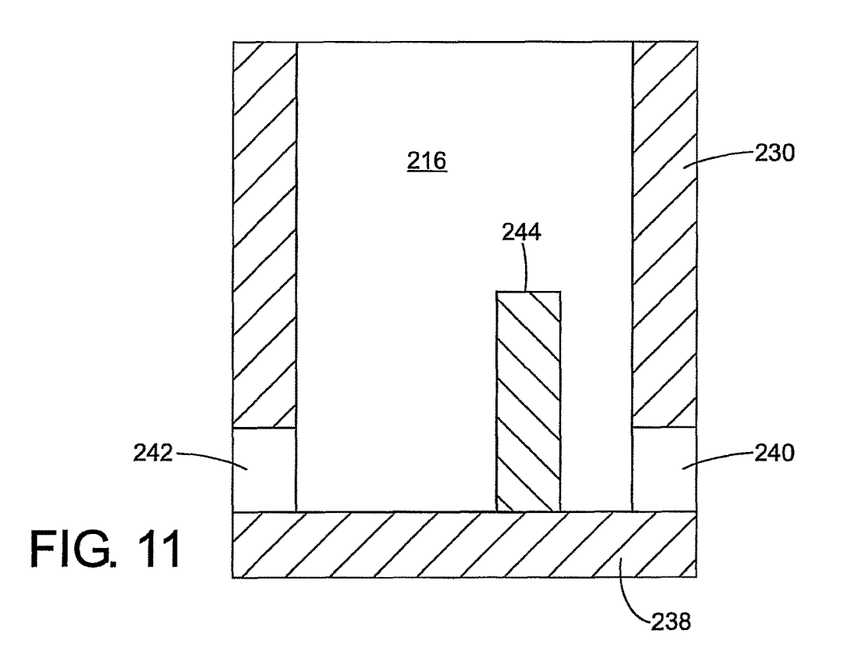
FIG. 11 is a cross-sectional view of the charge well of FIG. 10 taken along line 11-11.

FIGS. 10 and 11 are provided to illustrate an alternative shape of the charge well 216. Moreover, in this embodiment, charge well 216 is comprised of a cylindrical side wall 230 dissected by an interior wall 244. In this regard, it is noted that the similar concept of interior wall 244 lying between the inlet 240 and the outlet 242 is maintained. Also depicted is an alternative configuration wherein the wall 244 has been rotated to the position 244' (shown in phantom). Moreover, it is believed that an interior wall angled off perpendicular relative to an axis between the inlet 240 and outlet 242 may be advantageous. Accordingly, an interior wall oriented at an angle between, for example, about 5 and about 85 degrees to the axis between the inlet and outlet may be desirable.

The charge well of the present disclosure can comprise an open top chamber including walls constructed of a heat resistant material. Graphite and ceramic are good examples of suitable heat resistant materials. The chamber includes an inlet positioned in a side wall or base wall and in fluid communication with the pump well and an outlet in a side wall in fluid communication with the dross wall. Generally, the internal form of the chamber can be described as a bottom or low side wall inlet and a side wall outlet with a wall between the inlet and outlet. The height of the interior wall can be between 10 and 75 percent, preferably between 20 and 60 percent, of the height the lowest side wall. In this manner, the interior wall can be sufficiently tall to create the waterfall, folding action desirable for scrap submergence yet not too high where excessive turbulence occurs and oxidation of the metal is induced. In some embodiments, the interior wall can extend between opposed side walls. Alternatively, the interior wall could extend between corners. It is also contemplated that the interior wall does not extend fully between side walls. For example, one or both ends of the interior wall may be spaced from the adjacent side wall. However, to obtain the desired waterfall/folding fluid flow in the downstream compartment, it is desirable for the wall to occupy at least 50% or at least 75% of the distance between opposing side walls. In this context, it is feasible for the wall to be discontinuous, such as where gaps are provided between adjacent regions of the wall. Similarly, it is contemplated that the interior wall is not oriented in a straight line and/or has regions of different heights. Furthermore, it is feasible that the interior wall may include passages. Each of these modifications to the interior wall is considered a suitable mechanism by which to enhance flow within compartment 48. For example, it is possible that a region of compartment 48 which is remote from the outlet may exhibit a relatively lower rate of molten metal turnover, acting somewhat as a dead zone in which metal scrap may become stalled. Adding a notch or passage in the interior wall adjacent this region of the compartment may improve molten metal flow.

In some embodiments in the inlet and outlet are in opposed side walls. In other embodiments the inlet and outlet are in adjacent side walls. Yet in a further embodiment the inlet and outlet are in the same side wall. Each of these configurations are feasible via the arrangement of the pump well, and dross well adjacent the respective inlet and outlet walls of the charge well. Furthermore, it is contemplated that a refractory channel can be formed to direct molten metal. In this manner, although the dross well, for example is adjacent a first side of the charge well, molten metal could exit from an alternative wall of the charge well and be directed to the dross well. A similar construction could be used for introducing molten metal from the pump well into the charge well. The base wall, the at least one side wall and the interior wall can be constructed of a refractory material In certain embodiment, it may be desirable for charge well wall to be a single wall in the form of a cylinder. In the case of a cylindrical charge well the interior wall can form a chord extending between points on the single wall. Typically, the interior wall will be located closer to the inlet than to the outlet. In certain embodiments it may be desirable for the charge well to include a ramp. The ramp can be disposed between the inlet and the interior wall. In certain embodiments it may be desirable for the charge well to include only a ramp. Similarly, in certain embodiments, it may be advantageous to provide a partial ramp or a ramp of an alternative shape, such as stair stepped. In addition, it may be advantageous to include the ramp in compartment 48 or in both compartments.

The following examples are provided to facilitate the explanation of the invention but are not intended to limit the invention to the specific embodiments disclosed therein.

EXAMPLES

Water Modeling

Water modeling tests of the present system were conducted to evaluate performance. Particularly, a Pyrotek, Inc. J50 molten metal pump was used in association with a scrap submergence well of the type depicted in FIG. 3. The pump outlet was positioned to direct water into a 10"W×6.5"H inlet in the scrap submergence well. An outlet of 14"W×8"H was oriented in the opposite wall as shown in FIG. 3. The system was evaluated by introducing floating glue sticks into the inlet of the pump, or on the inlet side of the charge well, at various speeds of operation. Effectiveness of scrap submergence was determined by the number of sticks which exited the scrap submergence well and the time required to do so. Moreover, to exit the well, the sticks necessarily had to be submerged which is a valuable indicator of metal scrap submergence capability.

In a first set of tests, five glue sticks were deposited into the inlet of the pump operating at 150 RPM and various configurations of walls and ramps were evaluated to determine the time for each glue stick to exit the charge well. Each test was performed in a 30.5" water depth.

| CONFIG-URATION | STICK 1 | STICK 2 | STICK 3 | STICK 4 | STICK 5 |
|---|---|---|---|---|---|
| (A) No wall | 24 sec. | 45 sec. | 90 sec. | 165 sec. | >240 sec. |
| (B) 21" wall | 15 sec. | 20 sec. | 30 sec. | 31 sec. | 60 sec. |
| (C) 21" wall (w) ramp (12" rise) | 11 sec. | 20 sec. | 29 sec. | 32 sec. | 38 sec. |
| (D) Ramp (12" rise) | Better than A and worse than B and C | Better than A and worse than B and C | Better than A and worse than B and C | Better than A and worse than B and C | Better than A and worse than B and C |

The system was further evaluated in the following configurations (i) 12" wall; (ii) 12" wall with ramp; (iii) 21" wall; and (iv) 21" wall with ramp. The ramp inclusive embodiments were a structure as shown in FIGS. 6 and 7, wherein the ramp had a 12" rise. For each design, various water depths were tested.

WALL 21"/RAMP/20" WATER DEPTH
STICKS CHARGED TO PUMP INLET

| RPM | TIME (seconds) | RESULT |
|---|---|---|
| 150 | 90 | 3 OUT/1RW/1EW |
| 200 | 60 | 5 OUT |
| 200 | 60 | 5 OUT |
| 200 | 45 | 4 OUT/1RW |
| 250 | 30 | 5 OUT |
| 250 | 30 | 4 OUT/1RW |
| 250 | 30 | 5 OUT |

WALL 21"/20" WATER DEPTH
STICKS CHARGED TO PUMP INLET

| RPM | TIME (seconds) | RESULT |
|---|---|---|
| 150 | 90 | 3 OUT/1RW/1EW |
| 200 | 40 | 5 OUT |
| 200 | 40 | 5 OUT |
| 250 | 30 | 5 OUT |
| 250 | 30 | 5 OUT |
| 250 | 30 | 4 OUT/1EW |

21" WALL/RAMP/20" WATER DEPTH
STICKS CHARGED TO WELL

| RPM | TIME (seconds) | RESULT |
|---|---|---|
| 250 | 20 | 5 OUT |
| 250 | 15 | 4 OUT/1EW |
| 200 | 20 | 5 OUT |
| 200 | 15 | 4 OUT/1EW |
| 150 | 90 | 5EW |

21" WALL/20" WATER DEPTH
STICKS CHARGED TO WELL

| RPM | TIME (seconds) | RESULT |
|---|---|---|
| 250 | 20 | 5 OUT |
| 250 | 15 | 4 OUT/1EW |
| 200 | 20 | 3 OUT/2EW |
| 200 | 20 | 4 OUT/1EW |
| 150 | 90 | 2 OUT/3EW |

12" WALL/RAMP/20" WATER DEPTH
STICKS CHARGED TO PUMP INLET

| RPM | TIME (seconds) | RESULT |
|---|---|---|
| 250 | 30 | 5 OUT |
| 250 | 30 | 5 OUT |
| 250 | 30 | 5 OUT |
| 200 | 30 | 4 OUT/1EW |
| 200 | 30 | 5 OUT |
| 200 | 30 | 5 OUT |
| 150 | 30 | 4 OUT/1EW |
| 150 | 30 | 4 OUT/1EW |
| 150 | 30 | 4 OUT/1EW |

12" WALL/20" WATER DEPTH
STICKS CHARGED TO PUMP INLET

| RPM | TIME (seconds) | RESULT |
|---|---|---|
| 250 | 30 | 5 OUT |
| 250 | 30 | 5 OUT |
| 250 | 30 | 4 OUT/1EW |
| 200 | 30 | 5 OUT |
| 200 | 30 | 5 OUT |
| 200 | 30 | 5 OUT |
| 150 | 30 | 4 OUT/1EW |
| 150 | 30 | 3 OUT/2EW |
| 150 | 30 | 3 OUT/2EW |

12" WALL/RAMP/20" WATER DEPTH
STICKS CHARGED TO WELL

| RPM | TIME (seconds) | RESULT |
|---|---|---|
| 150 | 30 | 5 OUT |
| 200 | 20 | 5 OUT |
| 200 | 20 | 4 OUT/1EW |
| 250 | 20 | 5 OUT |
| 250 | 20 | 4 OUT/1EW |

12" WALL/20" WATER DEPTH
STICKS CHARGED TO WELL

| RPM | TIME (seconds) | RESULT |
|---|---|---|
| 150 | 60 | 4 OUT/1EW |
| 200 | 20 | 3 OUT/2EW |
| 200 | 20 | 4 OUT/1EW |
| 250 | 20 | 5 OUT |
| 250 | 15 | 4 OUT/1EW |

12" WALL/22" WATER DEPTH
STICKS CHARGED TO PUMP INLET

| RPM | TIME (seconds) | RESULT |
|---|---|---|
| 250 | 30 | 5 OUT |
| 250 | 30 | 5 OUT |
| 250 | 20 | 5 OUT |
| 200 | 30 | 5 OUT |
| 200 | 20 | 4 OUT/1EW |
| 200 | 20 | 5 OUT |
| 150 | 30 | 4 OUT/1EW |
| 150 | 30 | 5 OUT |
| 150 | 30 | 3 OUT/1EW |

21" WALL/22" WATER DEPTH
STICKS CHARGED TO PUMP INLET

| RPM | TIME (seconds) | RESULT |
|---|---|---|
| 250 | 30 | 4 OUT/1RW |
| 250 | 30 | 5 OUT |
| 250 | 20 | 5 OUT |
| 200 | 30 | 4 OUT/1EW |
| 200 | 30 | 2 OUT/3EW |
| 200 | 30 | 3 OUT/2RW |
| 150 | 30 | 3 OUT/1RW/1EW |
| 150 | 30 | 3 OUT/2EW |
| 150 | 30 | 3 OUT/2EW |

| 12" WALL/25" WATER DEPTH STICKS CHARGED TO PUMP INLET | | |
|---|---|---|
| RPM | TIME (seconds) | RESULT |
| 250 | 30 | 5 OUT |
| 250 | 30 | 4 OUT/1EW |
| 250 | 20 | 5 OUT |
| 200 | 30 | 5 OUT |
| 200 | 20 | 4 OUT/1EW |
| 200 | 20 | 4 OUT/1EW |
| 150 | 30 | 5 OUT |
| 150 | 30 | 5 OUT |
| 150 | 20 | 5 OUT |

| 21" WALL/25" WATER DEPTH STICKS CHARGED TO PUMP INLET | | |
|---|---|---|
| RPM | TIME (seconds) | RESULT |
| 250 | 30 | 5 OUT |
| 250 | 30 | 5 OUT |
| 250 | 20 | 4 OUT/1EW |
| 200 | 30 | 5 OUT |
| 200 | 30 | 5 OUT |
| 200 | 20 | 5 OUT |
| 150 | 30 | 4 OUT/1EW |
| 150 | 30 | 3 OUT/2EW |
| 150 | 30 | 3 OUT/2EW |

| 12" WALL/28" WATER DEPTH STICKS CHARGED TO PUMP INLET | | |
|---|---|---|
| RPM | TIME (seconds) | RESULT |
| 250 | 30 | 5 OUT |
| 250 | 30 | 5 OUT |
| 250 | 20 | 5 OUT |
| 200 | 30 | 5 OUT |
| 200 | 20 | 5 OUT |
| 200 | 20 | 5 OUT |
| 150 | 30 | 5 OUT |
| 150 | 30 | 5 OUT |
| 150 | 20 | 3 OUT/2EW |

| 21" WALL/28" WATER DEPTH STICKS CHARGED TO PUMP INLET | | |
|---|---|---|
| RPM | TIME (seconds) | RESULT |
| 250 | 30 | 5 OUT |
| 250 | 30 | 5 OUT |
| 250 | 20 | 5 OUT |
| 200 | 30 | 4 OUT/1EW |
| 200 | 30 | 4 OUT/1EW |
| 200 | 20 | 5 OUT |
| 150 | 30 | 3 OUT/1RW/1EW |
| 150 | 30 | 5 OUT |
| 150 | 30 | 4 OUT/1EW |

RW = Compartment 46
EW = Compartment 48

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A metal scrap submergence device comprising an open top chamber including four side walls forming a rectangular shape and a base wall, each of said side walls and the base wall comprised of a heat resistant material, an inlet in a first side wall of the chamber for receiving molten metal, an outlet in a second side wall of said chamber, an interior wall extending from the base wall, said interior wall having a height lower than a height of said side side walls, said interior wall extending between and contacting at least two side walls such that molten metal must pass over the interior wall when flowing from the inlet to the outlet.

2. The scrap submergence device of claim 1, wherein the height of said interior wall is between 10 and 75 percent of the height of the side walls.

3. The scrap submergence device of claim 1, wherein the inlet and outlet are in opposed side walls.

4. The scrap submergence device of claim 1, wherein the inlet and outlet are in adjacent side walls.

5. The scrap submergence device of claim 1, further including a ramp.

6. The scrap submergence device of claim 5, wherein said ramp is disposed between said inlet and the interior wall.

7. The scrap submergence device of claim 1, wherein said interior wall is located closer to said inlet than to said outlet.

8. The scrap submergence device of claim 1, wherein said base wall, said at least one side wall and said interior wall are comprised of a refractory material.

9. A metal scrap submergence device comprising an open top chamber including a side wall forming a cylinder and a base wall of a heat resistant material, an internal wall extending from said base wall, said internal wall contacting the side wall at opposed ends, said internal wall having a height less than the side wall, an inlet in a first portion of the side wall for receiving molten metal, a ramp adjacent the inlet and an outlet in a second portion of the side wall which is 180° opposed to the first portion.

10. The scrap submergence device of claim 9 wherein said internal wall is angled relative to an axis between said inlet and said outlet between about 5 and about 85 degrees.

11. A method for recycling of metal scrap comprising circulating molten metal to a scrap submergence device, said device comprising an open top chamber including at least one side wall and a base wall, said side wall and the base wall being comprised of a heat resistant material, an inlet in the side wall of the chamber for receiving molten metal, an outlet in the side wall of said chamber, an interior wall extending from the base wall, opposed ends of the interior wall contacting the side wall, said interior wall having a height lower than a height of the side wall, the inlet being disposed on a first side of the interior wall and the outlet being disposed on a second side of the interior wall such that molten metal must flow over the interior wall when traveling from the inlet to the outlet, the method further comprising depositing metal scrap onto a surface of the circulating molten metal within the device.

12. The method of claim 11, wherein a majority of the metal scrap is added to the outlet side of the interior wall.

13. The device of claim 9, wherein said internal wall is between 10 and 75% of the height of the side wall.

14. The device of claim 9, wherein said internal wall is perpendicular to an imaginary line between said inlet and said outlet.

* * * * *